Feb. 4, 1947.　　　A. J. VAN PESKI　　　2,415,197
PROCESS FOR ISOMERIZING HYDROCARBONS
Filed Oct. 9, 1939　　　2 Sheets-Sheet 2
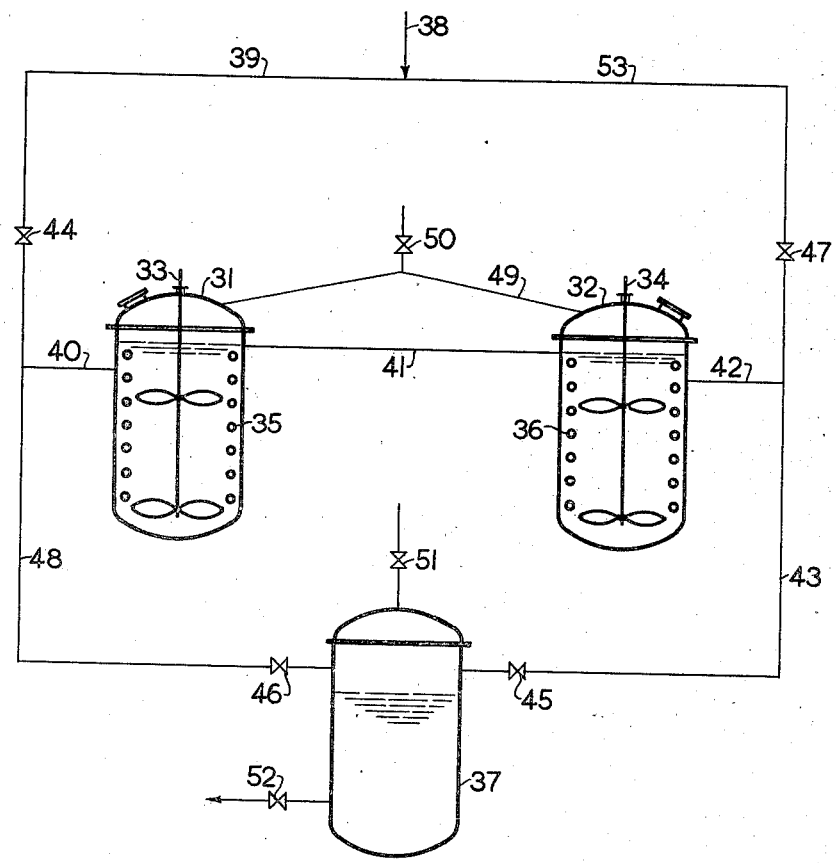
FIG. II
Inventor: Adrianus Johannes van Peski
By his Attorney:

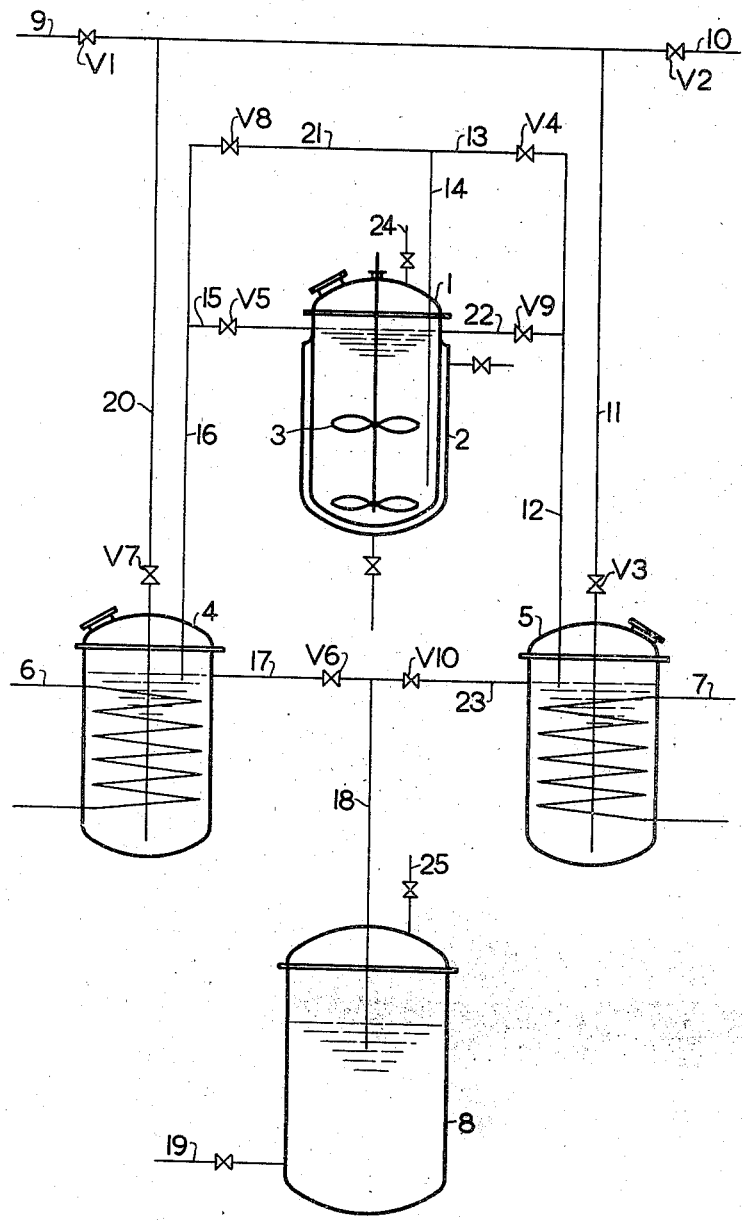
FIG. I

Patented Feb. 4, 1947

2,415,197

UNITED STATES PATENT OFFICE 2,415,197

PROCESS FOR ISOMERIZING HYDROCARBONS

Adrianus Johannes van Peski, Amsterdam, Netherlands, assignor to Shell Development Company, San Francisco, Calif., a corporation of Delaware Application October 9, 1939, Serial No. 298,594
In the Netherlands October 21, 1938

13 Claims. (Cl. 260—683.5)

The present invention relates to a process and apparatus for treating hydrocarbons in the liquid phase with metal halides. More particularly, the invention relates to a process and apparatus for isomerization of hydrocarbons and/or increasing the antiknock characteristics of hydrocarbon fuels with the aid of Friedel-Crafts type catalysts.

As is well known, most of the hydrocarbons of any given empirical formula are capable of existing in a large number of isomeric modifications. Certain of these modifications, particularly those having a highly branched structure, are chemically more reactive and have better ignition characteristics than others. Since these hydrocarbons occur in petroleum and other common sources predominantly in their normal and slightly branched modifications, a process for the economical isomerization of these less desirable modifications to more desirable modifications is of great value.

It is known that the isomerization of hydrocarbons from one modification to another may be effected with the aid of certain catalysts of the Friedel-Crafts type. Of the various catalysts found to catalyze the isomerization reactions, the aluminum halides, such as aluminum chloride and aluminum bromide, are by far the most effective.

In the various processes hitherto proposed for the practical isomerization of hydrocarbons, the consumption of catalyst is relatively high and considerable difficulty is often experienced in recovering the desired isomerized hydrocarbons from the reaction products. I have traced these difficulties to their source and have discovered a method of execution whereby they may be substantially obviated. When treating hydrocarbons according to the present invention, the recovery of the desired products is greatly facilitated, and the consumption of catalyst is often materially decreased.

The present process and apparatus are generally applicable for the liquid phase treatment of lower boiling aliphatic hydrocarbons having molecular weights between about 58 and 168 with Friedel-Crafts type catalysts at moderately elevated temperatures. By "moderately elevated temperatures," I mean temperatures above room temperature but below that at which degradation reactions take place to a substantial extent in the presence of the particular catalyst in question. The process and apparatus of the invention are especially applicable and advantageous for catalytic isomerization processes, particularly when the catalyst employed is an aluminum halide. Thus, they are particularly adapted for the catalytic isomerization of n-butane to iso-butane, n-pentane to iso-pentane, n-hexane to iso-hexane, etc., and for the isomerization of saturated gasoline fractions having poor antiknock characteristics. For details as to the hydrocarbons, catalysts, promoters, temperatures, pressures, and other materials and conditions which may be suitably employed in these processes, I refer to the prior art and, in particular, to United States Patent Numbers 2,249,366; 2,250,410; and 2,271,043, and French Patent Number 823,595.

According to the process of the present invention, the hydrocarbon or hydrocarbon mixture to be treated and the solid catalyst are introduced into a suitable reaction chamber, preferably provided with heating and mixing means, and contacted therein under the desired conditions of temperature, pressure, time, etc. The liquid hydrocarbon phase is withdrawn from the reaction chamber and conducted to one or more chambers, preferably provided with heating and cooling means, wherein it is cooled. During the cooling operation small amounts, and oftentimes appreciable amounts, of very active catalyst are precipitated. The solubility of most metal halides, including aluminum chloride, in the hydrocarbons employed is known to be quite small. This small amount of very active catalyst in solution, however, causes decomposition and reversed isomerization reactions in subsequent treatments, especially in distillation, and is very detrimental. The solubility of the metal halides in the hydrocarbon phase is, moreover, often considerably increased by the hydrogen halides usually employed. The cooled hydrocarbon reaction product, substantially free of dissolved catalyst, is withdrawn and subjected to such other treatments or recovery operations as may be required. A fresh quantity of hydrocarbon to be treated is then introduced into the chamber containing the precipitated catalyst and heated therein to effect dissolution. The fresh charge of hydrocarbon containing dissolved catalyst is then introduced into the reaction chamber containing the main body of catalyst. After the reaction, the liquid hydrocarbon phase is withdrawn to a cooling chamber, and the cycle is repeated as described.

It is preferable to provide a plurality of chambers for the precipitation and subsequent dissolution of the catalyst. The chambers may then be used in turn and an increased production capacity of the reaction chamber realized. A suitable quantity of fresh catalyst may be periodically charged to the reaction chamber, if desired, to offset the deterioration of the catalyst with use.

In the above I have described my invention as employed in an intermittent manner. According to a preferred embodiment of the invention, the process is executed continuously. The continuous process may be advantageously executed in an apparatus, such as illustrated diagrammatically in the accompanying drawings and further described below with reference to the isomerization of a saturated aliphatic hydrocarbon with the aid of aluminum chloride and hydrogen chloride.

Referring to Figure I of the drawings, 1 designates any suitable reaction chamber, preferably provided with heating means 2, and stirring means 3, and capable of withstanding the operating pressure. Numbers 4 and 5 designate precipitation-dissolution chambers. Chambers 4 and 5 are preferably equipped with cooling and/or heating means such as closed coils 6 and 7. By circulating suitable media through the coils, the chambers may be cooled to effect precipitation, or warmed to effect dissolution. If desired, separate means for heating and cooling may be provided, or, in some cases, the cooling may be allowed to take place naturally without resort to coils or the like. Number 8 designates a storage vessel in which the final product may be collected. This storage vessel is not an essential part of the apparatus and may be omitted, if desired.

The hydrocarbon to be isomerized is continuously introduced via pipe 9, and hydrogen and/or hydrogen chloride are introduced in the required amounts via pipe 10. The mixture passes via pipe 11 to chamber 5 containing solid aluminum chloride precipitated from the hydrocarbon reaction product in a preceding phase of the process. The hydrocarbon-hydrogen chloride mixture entering chamber 5 is heated therein in order to dissolve the aluminum chloride. The hydrocarbon-hydrogen chloride mixture, containing a certain amount of aluminum chloride in solution, then passes via pipes 12, 13 and 14, to the reaction chamber 1. In the reaction chamber the hydrocarbon is contacted with solid catalyst at a moderately elevated temperature and under the desired pressure, preferably with stirring. The liquid hydrocarbon phase is continuously withdrawn from the reaction chamber via pipe 15 and is conducted via pipe 16 to chamber 4 wherein it is cooled. As a result of the cooling in chamber 4, aluminum chloride dissolved in the hydrocarbon is precipitated. The cooled and substantially aluminum chloride-free hydrocarbon continuously passes via pipes 17 and 18 to the storage vessel 8, from which it is withdrawn as required via valved outlet 19. During the above-described phase of the process valves V1, V2, V3, V4, V5, and V6 are open and valves V7, V8, V9, and V10 are closed.

When the aluminum chloride in chamber 5 is dissolved, the procedure may be reversed. Chamber 4 is then heated; chamber 5 is cooled; valves V3, V4, V5, and V6 are closed; valves V7, V8, V9, and V10 are opened; and the hydrocarbon flows via pipe 20, chamber 4, pipes 16, 21, and 14, reaction chamber 1, pipes 22 and 12, chamber 5, and pipes 23 and 18.

Instead of introducing hydrogen and/or hydrogen chloride via pipe 10 in admixture with the hydrocarbon, either or both of these agents may be introduced directly into the reaction chamber via a valved inlet 24. Also, by suitably adjusting the liquid level in the reaction chamber, one may withdraw only liquid hydrocarbon phase with substantially no gas. The amount of gas and the pressure in the system may also be adjusted, if desired, by means of a valved outlet 25.

While the above-described assembly of apparatus is more advantageous in the practical execution of the process, the process may, if desired, also be executed continuously in an assembly of apparatus such as illustrated in Figure II of the accompanying drawings. The apparatus diagrammatically illustrated in Figure II comprises two vessels, 31 and 32, each provided with stirring means, 33 and 34, and heating and cooling means such as closed coils, 35 and 36, and a collection vessel, 37. During operation, the hydrocarbon to be treated is continuously conducted via pipes 38, 39, and 40 into chamber 31, wherein it is contacted with solid catalyst at the desired temperature and for the desired time. The reacted hydrocarbon containing catalyst in solution then passes via pipe 41 into chamber 32, wherein dissolved catalyst is precipitated out by cooling. The cooled hydrocarbon product, substantially free of catalyst, passes via pipes 42 and 43 to the collection vessel 37. During this phase of the process valves 44 and 45 are open, and valves 46 and 47 are closed.

When a substantial amount of the catalyst has been transferred from reactor 31 to chamber 32, and/or when the catalytic efficiency in reactor 31 has declined to an arbitrarily set minimum, chamber 31 is cooled, chamber 32 is heated to the reaction temperature, and the flow of hydrocarbon is reversed. In this phase of the process valves 46 and 47 are open, valves 44 and 45 are closed, and the hydrocarbon to be treated is conducted via pipes 38, 53, and 42 into chamber 32, wherein it is contacted with solid catalyst at the desired temperature and for the desired time, and thence via pipe 41 to chamber 31, wherein it is cooled. The cooled hydrocarbon product, substantially free of catalyst, then passes via pipes 40 and 48 to the collection chamber 37. By periodically reversing the flow, the process is executed substantially continuously with high efficiency and minimum catalyst consumption.

If desired, hydrogen halide, hydrogen, and/or other gaseous media or reactants may be introduced into the system along with the hydrocarbon to be treated, or via an inlet 50 and interconnecting pipe 49. The quantity of gas in the system and/or the rate of flow may be regulated via pipe 51. The liquid product is removed from the system via a valved outlet 52.

*Example*

Normal butane was introduced, together with 50% by weight of aluminum chloride, into a reaction chamber provided with heating and stirring means, and then 20% by weight of gaseous hydrogen chloride pressed in. The mixture was reacted for four hours at 70° C. The hydrocarbon phase, containing a small amount of hydrogen chloride and aluminum chloride in solution, was withdrawn to a separate chamber and cooled to 10° C., whereupon substantially all of the dissolved aluminum chloride precipitated out. The cooled hydrocarbon phase, consisting essentially of a mixture of normal and isobutane, was withdrawn and subsequently treated to remove the traces of aluminum chloride and hydrogen chloride contained therein.

A fresh quantity of normal butane was then charged to the chamber containing the precipitated aluminum chloride and heated therein to about 80° C. After the aluminum chloride had dissolved, the solution was conducted to the reaction chamber. Hydrogen chloride was pressed in as before and the mixture was reacted for four hours at about 70° C. The hydrocarbon phase was then withdrawn and freed of dissolved aluminum chloride in the same manner as with the preceding charge, whereupon further charges of normal butane could be treated in the same manner with the same catalyst.

The above described example and diagrammatic illustrations are presented solely to facilitate the ready understanding of the invention. I am aware that numerous modifications will be readily apparent to those skilled in the art. It is to be understood, therefore, that no limitations are intended other than those imposed by the scope of the appended claims.

I claim as my invention:

1. In a process for the liquid phase isomerization of an isomerizable paraffinic hydrocarbon with the aid of an aluminum halide isomerization catalyst, the steps comprising continuously passing the hydrocarbon to be isomerized in the liquid phase through a heated zone containing solid aluminum halide wherein aluminum halide is dissolved in the hydrocarbon feed, continuously passing the hydrocarbon feed containing dissolved aluminum halide through a second zone wherein it is isomerized at a moderately elevated temperature with additional aluminum halide in the solid phase, and continuously passing only the liquid hydrocarbon phase containing dissolved aluminum halide through a third zone wherein precipitation of solid aluminum halide is effected by cooling.

2. In a process for the liquid phase isomerization of an isomerizable paraffinic hydrocarbon with the aid of an aluminum halide isomerization catalyst, the steps comprising subjecting the hydrocarbon to be isomerized in the liquid phase to contact with solid aluminum halide under conditions such that aluminum halide is dissolved in the hydrocarbon feed, continuously passing the hydrocarbon feed containing dissolved aluminum halide through a zone of reaction wherein it is isomerized at a moderately elevated temperature with additional aluminum halide in the solid phase, and continuously passing only the liquid hydrocarbon phase containing dissolved aluminum halide through a zone of precipitation wherein precipitation of solid aluminum halide is effected by cooling.

3. In a process for the liquid phase isomerization of an isomerizable paraffinic hydrocarbon with the aid of an aluminum halide isomerization catalyst, the steps comprising continuously passing the hydrocarbon to be isomerized in the liquid phase at an elevated temperature through a first zone containing solid aluminum halide wherein aluminum halide is dissolved in the hydrocarbon feed, continuously passing the hydrocarbon feed containing dissolved aluminum halide through a second zone wherein it is isomerized at a moderately elevated temperature with additional aluminum halide in the solid phase, continuously passing only the liquid hydrocarbon phase containing dissolved aluminum halide through a third zone wherein precipitation of solid aluminum halide is effected by cooling, and periodically reversing the direction of hydrocarbon flow through, and the conditions of temperature in, said first and third zones.

4. In a process for the substantially continuous liquid phase isomerization of an isomerizable paraffin hydrocarbon with a solid isomerization catalyst containing a metal halide, the steps comprising initially bringing said metal halide into solution in said hydrocarbon, subsequently subjecting said solution essentially in the liquid phase to an isomerization treatment in a separate reaction zone in the presence of an additional but undissolved quantity of said solid catalyst whereby substantial isomerization of said hydrocarbon is effected, removing essentially said solution from said reaction zone after said treatment, separating dissolved metal halide from said solution, and repeating the operation with fresh isomerizable saturated hydrocarbon as the solvent medium for said separated metal halide.

5. In a process for the substantially continuous liquid phase isomerization of an isomerizable paraffin hydrocarbon with a solid isomerization catalyst containing a metal halide and gaseous halide promoter, the steps comprising bringing said metal halide into solution in said hydrocarbon to be isomerized, subjecting the solution essentially in the liquid phase to an isomerization treatment in a separate reaction zone in the presense of additional but undissolved quantities of said solid catalyst and promoter whereby substantial isomerization of said hydrocarbon is effected, removing essentially said solution from said reaction zone after said treatment, and thereafter separating from said solution isomerization products substantially devoid of said catalyst.

6. In a process for the substantially continuous liquid phase isomerization of an isomerizable paraffin hydrocarbon with a solid isomerization catalyst containing a metal halide and gaseous halide promoter, the steps comprising continuously passing a stream of said hydrocarbon at an elevated temperature in contact with said metal halide thereby bringing said metal halide into solution in said hydrocarbon, thereafter adding said promoter and continuously passing said solution essentially in the liquid phase into a separate reaction zone wherein it is subjected to an isomerization treatment in the presence of said promoter and of an additional but undissolved quantity of said solid catalyst whereby substantial isomerization of said hydrocarbon is effected, continuously removing essentially the solution from said reaction zone after said isomerization treatment, and thereafter separating from said solution isomerization products substantially devoid of said metal halide.

7. In a process for the substantially continuous isomerization of an isomerizable saturated hydrocarbon having a molecular weight between about 56 and about 168 with the aid of an aluminum halide isomerization catalyst, the steps comprising subjecting the liquid hydrocarbon to be isomerized to contact with a solid aluminum halide under conditions such that aluminum halide is dissolved in the hydrocarbon feed, continuously passing the hydrocarbon feed containing the aluminum halide to a reaction zone wherein it is isomerized in the liquid phase at a moderately elevated temperature in the presence of additional aluminum halide existing in solid phase, continuously withdrawing from said reaction zone only the hydrocarbon phase and recovering isomerized hydrocarbon substantially devoid of aluminum halide.

8. In a process for the substantially continuous isomerization of an isomerizable paraffin hydrocarbon with an isomerization catalyst comprising a hydrogen halide and a metal halide which has a low but appreciable solubility in said hydrocarbon wherein the hydrocarbon to be isomerized is contacted in a reaction zone under liquid phase isomerization conditions with a main body of the catalyst existing as a solid phase, the steps of at least partially saturating the liquid hydrocarbon feed with said metal halide prior to introduction into the reaction zone, separating metal halide from the hydrocarbon phase withdrawn from the reaction zone, and utilizing said separated metal halide to partially saturate said feed.

9. In a process for the substantially continuous isomerization of butane with an aluminum chloride isomerization catalyst and hydrogen chloride promoter the steps of dissolving aluminum chloride in at least a portion of the butane feed and thereafter contacting said butane under liquid phase isomerization conditions with a main body of solid aluminum chloride isomerization catalyst in a separate reaction zone thereby to prevent removal of said aluminum chloride from said reaction zone.

10. In a process for the substantially continuous isomerization of butane with an aluminum chloride isomerization catalyst and hydrogen chloride promoter the steps of dissolving aluminum chloride in at least a portion of the butane feed, and thereafter adding hydrogen chloride promoter and contacting said mixture in a separate isomerization zone under liquid phase isomerization conditions with a main body of solid aluminum chloride isomerization catalyst thereby to prevent removal of said solid aluminum chloride from said isomerization zone.

11. In a process for the substantially continuous isomerization of an isomerizable saturated hydrocarbon having a molecular weight between 56 and 168 with an aluminum chloride isomerization catalyst and hydrogen chloride promoter, the steps of at least partially saturating the liquid isomerizable paraffin hydrocarbon feed with aluminum chloride and thereafter contacting said hydrocarbon feed containing aluminum chloride under liquid phase isomerization conditions with a main body of solid aluminum chloride isomerization catalyst in a separate reaction zone.

12. In a process for the substantially continuous isomerization of an isomerizable paraffin hydrocarbon with a solid aluminum chloride-containing catalyst and a hydrogen chloride promoter, the combination of steps comprising passing isomerizable paraffin hydrocarbon to be isomerized at an elevated temperature in the liquid phase through a zone containing solid aluminum chloride and under conditions to dissolve aluminum chloride therein and thereafter continuously passing the isomerizable paraffin hydrocarbon containing dissolved aluminum chloride through a second zone wherein it is isomerized in the liquid phase at a moderately elevated temperature with a main body of said solid aluminum chloride-containing catalyst.

13. In a process for the substantially continuous isomerization of an isomerizable paraffin hydrocarbon with a solid aluminum chloride-containing catalyst and a hydrogen chloride promoter, the combination of steps comprising passing isomerizable paraffin hydrocarbon to be isomerized at an elevated temperature in liquid phase through a zone containing solid aluminum chloride and under conditions to dissolve aluminum chloride therein and thereafter adding hydrogen chloride promoter and continuously passing the mixture through a second zone wherein the isomerizable paraffin hydrocarbon is isomerized in the liquid phase at a moderately elevated temperature with a main body of said solid aluminum chloride-containing catalyst.

ADRIANUS JOHANNES van PESKI.

REFERENCES CITED

The following references are of record in the file of this patent:

UNITED STATES PATENTS

| Number | Name | Date |
|---|---|---|
| 2,169,494 | Ipatieff et al. | Aug. 15, 1939 |
| 2,160,177 | Schuman | May 30, 1936 |
| 2,047,545 | Buttfield | July 14, 1936 |
| 1,716,372 | Downs | June 11, 1929 |
| 2,288,477 | Montgomery | June 30, 1942 |
| 2,220,092 | Evering et al. | Nov. 5, 1940 |

FOREIGN PATENTS

| Number | Country | Date |
|---|---|---|
| 823,595 | French | Jan. 22, 1938 |

OTHER REFERENCES

Glasebrook et al.—Jour. Am. Chem. Soc., vol. 58, 1944–48 (1936), Patent Office Library.

Montgomery et al.—Four. Am. Chem. Soc., vol. 59, 1768–9 (1937), Patent Office Library.

Petrov et al.—Oil and Gas Journal, Feb. 2, 1939, pp. 42 and 45, Patent Office Library.